Nov. 26, 1940.    W. P. FITZ-RANDOLPH    2,223,063
ABRASIVE ARTICLE
Original Filed Oct. 7, 1937    2 Sheets—Sheet 1

INVENTOR.
WILLIAM P. FITZ-RANDOLPH
BY
ATTORNEY.

Nov. 26, 1940.     W. P. FITZ-RANDOLPH     2,223,063
ABRASIVE ARTICLE
Original Filed Oct. 7, 1937     2 Sheets-Sheet 2
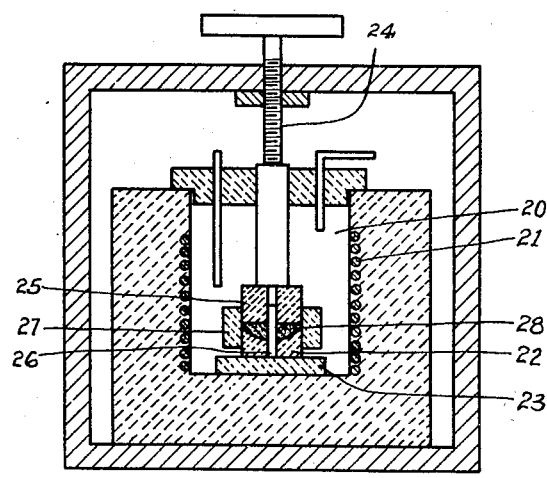
INVENTOR.
WILLIAM P. FITZ-RANDOLPH
BY
ATTORNEY.

Patented Nov. 26, 1940

2,223,063

UNITED STATES PATENT OFFICE 2,223,063

ABRASIVE ARTICLE

William P. Fitz-Randolph, Niagara Falls, N. Y., assignor to The Carborundum Company, Niagara Falls, N. Y., a corporation of Delaware Original application October 7, 1937, Serial No. 167,808. Divided and this application September 1, 1939, Serial No. 293,114

8 Claims. (Cl. 51—309)

This invention relates to the forming of articles from metal powders, and particularly to the bonding of non-metallic particles with metal. The invention is especially concerned with the metal bonding of diamonds and to the articles so produced, but it is also applicable to the bonding of other abrasives and other non-metallic materials.

One of the objects of the invention is to produce a mix containing metal powder which can be readily molded and sintered at a low temperature, and which at the same time forms a harder or more wear resistant article than is ordinarily produced by the sintering of low melting metals and alloys. Another object is to provide a metallic mixture in which the composition of the finished product, and hence the toughness and other physical properties of the material, can be varied by the time and temperature employed during the sintering process. A further object is to produce an improved metal bonded abrasive article, and particularly one containing diamonds. Another object is to produce a satisfactory metal bond for diamonds which matures at a relatively low temperature, as for example, below a red heat, at which temperature the original hardness and physical properties of the diamond are not impaired. These and other objects will be apparent from the following description.

In the metal bonding of diamonds, it has been considered necessary to employ high melting metals or alloys to secure satisfactory wear resistance for the metal matrix. The low melting metals are usually quite soft, and would not be expected to provide satisfactory wear resistance for a wheel intended to cut extremely hard materials. For this reason the commercial metal bonded diamond wheels have been restricted to those containing such hard bonds as iron, sintered tungsten carbide, and alloys containing molybdenum or other hard ingredients. These alloys must necessarily be sintered at high temperatures, with consequent danger of impairing the physical properties of the diamonds by the action of heat.

I have found that certain alloys of iron with tin and zinc can be sintered at temperatures as low as from 300 to 600° C., and that these alloys form very satisfactory abrasive bonds. In addition to the low sintering temperature of the alloys, they retain to a considerable extent the properties of a hard high melting metal. Iron forms very hard intermetallic compounds with tin and zinc, but as these compounds are formed only slowly at low temperatures, the mixture during incipient sintering consists merely of iron particles embedded in a tin or zinc matrix. The iron, however, is very hard compared with the tin or zinc, and as the low melting metal is alloyed to the surface of the iron particles, the iron particles present a wear resistant surface. As heating is continued, reaction to form an intermetallic compound or compounds takes place, and a considerable proportion of the low melting metal becomes used up in the formation of the compound. As the compound formation increases, the hardness of the bond also increases. In the tin rich portion of the iron-tin series the compound formed by the reaction of the iron and tin is $FeSn_2$; in the case of zinc, the definite compounds formed are $FeZn_7$ and $FeZn_3$. These reactions can be either incipient or carried to practical completion, depending upon conditions of sintering. An interstitial surface layer of intermetallic compound between the iron particles and the low melting metal can be produced at relatively low temperatures. The alloys possess the unusual characteristic of becoming less fluid with rising temperature, since with increasing reaction velocity the liquid low melting metal is used up in forming the solid compound. This partial fluidity of the mix at low temperatures is very desirable in the case of hot pressing. Upon completion of the reaction, however, alloys containing less than 81 per cent tin are completely solid up to temperatures of about 900° C.

The exact nature of the invention will be more clearly understood from a consideration of the accompanying drawing.

In the drawing:

Figure 6 is a section of a cup wheel in which the abrasive surface can be made from diamonds and an alloy bond of the type herein described;

Figure 7 is a section of a lens grinding disc, in which diamonds can be bonded with a tin-iron or zinc-iron alloy; and Figure 8 shows a method of sintering such a disc under pressure.

Figure 1:
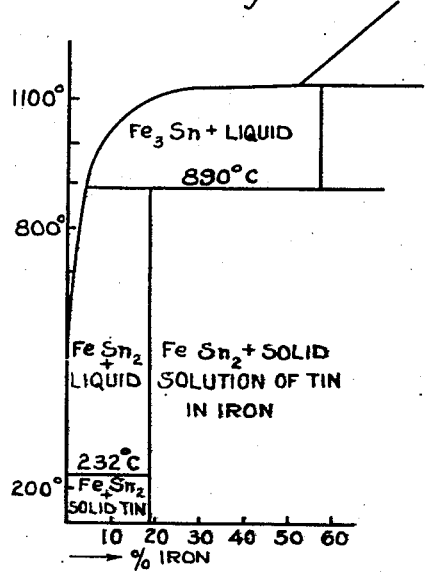
Figure 1 is a simplified equilibrium diagram of the tin-rich portion of the tin-iron series, showing the reactions which take place between iron and tin.
Figure 2:
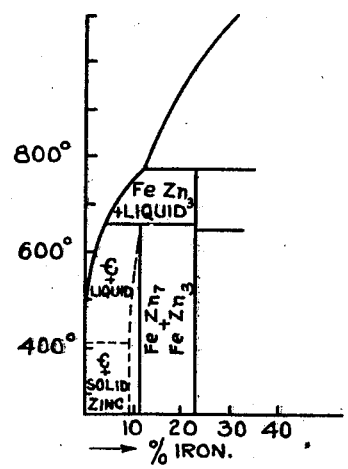
Figure 2 is a similar diagram for the zinc-iron alloys.

Referring to the drawing in detail, Figures 1 and 2 are the usual type of equilibrium diagram, illustrating the phase changes which occur with changes in temperature and composition of the alloy. It will be noticed that the temperature of complete melting rises very abruptly with the addition of only a small proportion of iron. With the addition of only 19 per cent iron to tin, free tin completely disappears from the alloy if heating is continued until equilibrium is reached. It will thus be observed that the initial mixture, if made from component metal powders, may contain as much as 81 per cent liquid tin when heated to 232° C., but after reaction has taken place, the alloy formed will contain no liquid or no free tin at all. Thus the alloy can be varied from about 81 per cent uncombined tin to no uncombined tin by simply varying the sintering conditions. There are very few instances in metallurgical practice where such a wide variation in physical characteristics can be effected with no change in the percentages of the original components of the alloy.

Similar relations obtain with the zinc-iron alloys, as is shown in Figure 2. The temperature of complete melting rises very abruptly when only a small proportion of iron is added to the zinc. The compounds formed are $FeZn_3$ and $FeZn_7$; the latter compound forms quite readily. The phase designated as epsilon on the diagram consists of a solid solution in which $FeZn_7$ forms the base. Bonds for diamonds within the range of compositions up to about 30 per cent iron can be molded at low temperatures, but they show many of the characteristics of a high melting alloy bond.

Figure 3:
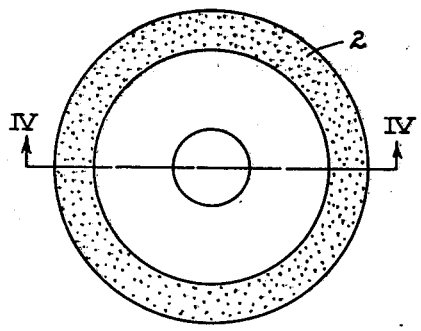
Figure 3 shows a plan view of a metal bonded diamond wheel which can be made by the process herein described, and which is adapted to the grinding or cutting of tungsten carbide tools.
Figure 4:
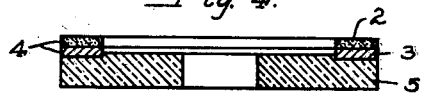
Figure 4 is a section of the wheel shown in Figure 3, the section being taken along the line IV—IV.

The wheel shown in Figures 3 and 4, which is suitable for the facing of tungsten carbide tools, consists of an abrasive layer 2 and a metal backing layer 3 which can be simultaneously sintered into a coherent mass. This mass forms an abrasive ring 4 which can be mounted on a backing 5 made of resin or other suitable material.

If the abrasive ring contains only a cheap abrasive such as silicon carbide or fused alumina, the entire ring can be made into a portion of homogeneous composition without the necessity of producing a composite structure. If the cutting portion of the wheel contains an expensive abrasive, however, such as diamonds or boron carbide, it is desirable to produce a composite ring in which only a relatively thin surface layer 2 contains the expensive abrasive material. In producing such a composite ring, it is also desirable to add a cheap abrasive to the backing 3 in approximately the proportions of the abrasive added in the surface layer 2 so that the shrinkage during sintering will be approximately the same for both layers.

In the case of metal bonded diamond wheels, I have found it to advantage to include in the mixture a certain proportion of a less hard abrasive such as silicon carbide, boron carbide or fused alumina. This additional abrasive is preferably somewhat finer in grit size than the diamonds, and when it is distributed through the matrix, it stiffens the metal and makes it very resistant to wear or abrasion. Thus, even in cases when the additional abrasive does no cutting whatever, it greatly reduces the wheel loss, which is ordinarily due to "undercutting" or tearing out of the metal matrix surrounding the diamonds. The addition of materials such as silicon carbide to the mix makes possible the use of a comparatively small percentage of diamonds of fairly coarse grit to do the cutting, with practically no wearing or tearing out of the surrounding matrix. The action of the softer abrasive in making the matrix resistant to wear is of special importance in the use of cut off wheels for cutting glass, silicon carbide and other hard materials which in themselves have abrasive characteristics. During the cutting operation a considerable portion of the wheel is buried in the cut, and the detritus formed in the cut, being finely divided, has a lapping effect upon the metal in which the diamonds are embedded. This lapping or wearing away is prevented by the presence of the abrasive distributed throughout the matrix between the particles of diamonds.

A detailed method of making an abrasive wheel of the type shown in Figures 3 and 4 can be illustrated by a specific example, although it will be understood that other compositions and methods of molding and sintering can be used. A mixture of for example 10% diamonds of from 80 to 140 grit, 10% silicon carbide of from 180 to about 400 grit, and 80% of powdered metal is introduced into the mold to form the cutting surface 2. The metal, which preferably consists of powdered components forming the desired alloy, is thoroughly mixed, screened, and mixed with the abrasive. The mix containing the diamonds is accurately leveled off, and a backing mixture of 20% silicon carbide and 80% metal powder is added to the mold to form the backing 3. If the material is to be cold molded, the entire mass is then pressed into a ring under a pressure of, for example, from 10,000 to 40,000 lbs./sq. in. This ring, after removal from the mold, can be sintered in an atmosphere which is non-reactive with respect to diamonds and the metal used as a bond, without the application of further consolidating pressure. It is desirable, however, to apply a slight pressure to the ring during sintering in order to prevent warping. The sintering in the case of the tin alloys can be from 250 to 500° C., although higher temperatures can be used if more complete compound formation is desired. With zinc alloys a temperature of from about 400 to 600° C. can be used. At these temperatures coalescence or alloying of the particles of metal powder into a strong body can be readily effected.

After the ring has been sintered, it is ready for mounting upon a suitable backing so that it can be used as an abrasive wheel or lap. The backing 5 indicated in Figure 4 may be a reversible thermoplastic resin, or a backing of metal can be used, and the sintering ring soldered to the metal, or sintered directly thereto.

Figure 5:
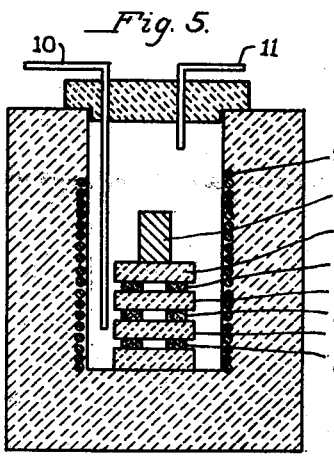
Figure 5 illustrates a method of sintering ring-shaped wheels of the type shown in Figures 3 and 4.

A convenient method of sintering wheels of the general type shown in Figures 3 and 4 is illustrated in Figure 5. In this figure, the wheels 6 are spaced between ceramic bats 7 and a weight 8 is placed upon the top of the uppermost bat to exert sufficient pressure to prevent warping during sintering. The furnace is heated by a wire wound resistor 9; an inert gas is introduced into the furnace through the pipe 10 and the excess gas escapes through the pipe 11.

A number of different atmospheres can be used for the sintering operation, the simplest and most convenient being ordinary illuminating gas. Hydrogen, helium and argon are also very satisfactory. If desired, the wheels can be sintered under vacuum.

Figure 6 shows a section of a cup wheel which has been found suitable for the surfacing of refractories such as silicon carbide or fire clay bricks and shapes. The abrasive layer 13 may consist of diamonds bonded with an alloy of zinc or tin containing iron, or can consist of a mixture of diamonds, silicon carbide or other abrasive, and the alloy bond. The backing 14 can be of resin, metal or any suitable material.

A section of a wheel which can be used for the grinding of lenses, in which the bond can be a sintered tin-iron or zinc-iron alloy, is shown in Figure 7. Such a wheel can be made by the method and from the mixes described in connection with the production of wheels of the type shown in Figures 3 and 4. The layer 16 containing the diamonds is first introduced into the mold and leveled off, and the mix to form the backing 17 then added. The backing layer may consist either of powdered metal or a mixture of powdered metal and an abrasive or filler cheaper than diamonds.

Figure 7 shows diagrammatically a method of sintering a lens grinding disc having a grinding surface of metal bonded diamonds, in which pressure is applied during the sintering process. The furnace chamber 20 is heated by the wire wound resistance element 21, and the mold 22 is placed upon a support 23 resting upon the bottom of the furnace. Pressure is applied by means of the screw jack 24. The mold plunger consists of a cylinder 25 which is bored to receive the pin 26. This pin also extends through the bottom or curved portion of the mold. In assembling the mold, the pin and the outer ring 27 are placed in position with respect to the curved portion 22, the powdered mix 28 is introduced into the mold around the pin 26. The cylindrical plunger 25 is then inserted so as to fit into the ring and at the same time surround the upper portion of the central pin. The mold parts are preferably made of hard carbon, but can also be made of heat resistant metal if desired. The mix can be compressed during the heating process from loose powder, or the articles can be pre-formed by cold pressing before the combined application of pressure and heat. This latter procedure results in a very dense article.

The alloy compositions which have been found most satisfactory for molded articles, and especially for diamond abrasive, are those containing up to about 30 per cent iron, as these compositions mold readily and can be sintered at low temperatures. Higher iron compositions can be used, but in the intermediate composition range free tin no longer exists in the alloy if complete reaction takes place. It is desirable in such cases to control the sintering operation so as to retain some uncombined tin, and consequently some uncombined iron, in the final product.

Although I have described the production of the alloys from their component metals during the sintering of the article, comminuted previously alloyed material can be used if desired. The use of component metals, however, has a number of advantages such as increased plasticity of the original mix, and the possibility of altering the physical properties of the metal through the degree of compound formation during sintering. With high tin or zinc mixes, the plasticity or fluidity of the mixes may be greater than is desired and previously alloyed material can be mixed with additional tin or zinc to produce a mix having practically any required molding characteristics.

Ternary alloys containing tin, zinc and iron up to about 30 per cent iron have been found to have properties similar to the binary compositions disclosed herein and can be used in the various articles and with the various methods herein set forth.

This application is a division of my application Serial No. 167,808, filed October 7, 1937, now Patent No. 2,173,834.

The invention can be defined as being within the scope of the following claims.

I claim:

1. A metal bonded abrasive article consisting of an abrasive comprising diamonds and a bond therefor composed of a sintered mixture of zinc and iron powders, the said bond containing both uncombined zinc and zinc combined in the form of an intermetallic compound with the iron, and the iron being present in an amount not more than about 30%.

2. A metal bonded abrasive article consisting of abrasive grain and a bond therefor composed of a sintered mixture of tin, zinc and iron powders, the said bond containing not more than about 30% iron and the predominant metal therein being zinc.

3. A metal bonded abrasive article consisting of abrasive grain and a bond therefor comprising a partially alloyed sintered mixture of metal powders including zinc and iron powders, the said bond containing not more than about 30% iron and the predominant metal therein being zinc.

4. A metal bonded abrasive article consisting of an abrasive comprising diamonds and a sintered alloy of zinc and iron as a bond therefor, the predominant metal in said alloy being zinc which is present in uncombined form and in combined form as an intermetallic compound with the iron.

5. A metal bonded abrasive article consisting of an abrasive comprising diamonds and a sintered alloy of zinc and iron as a bond therefor, the predominant metal in said alloy being zinc and at least a portion of both the zinc and iron being in the uncombined state.

6. A metal bonded abrasive article consisting of abrasive grain and a sintered alloy of zinc and iron as a bond therefor, said alloy containing not more than about 30% iron.

7. A metal bonded abrasive article consisting of abrasive grain and a metal bond therefor comprising a sintered mixture of metal powders including zinc powder and not more than about 30% iron powder, at least a substantial portion of the zinc and iron being alloyed.

8. A metal bonded abrasive article consisting of abrasive grain and a metal bond therefor comprising a sintered mixture of metal powders composed of tin powder, zinc powder and not more than about 30% iron powder, at least a substantial portion of the tin, zinc and iron being alloyed.

WILLIAM P. FITZ-RANDOLPH.